US 9,247,162 B2

(12) United States Patent
Shen et al.

(10) Patent No.: US 9,247,162 B2
(45) Date of Patent: Jan. 26, 2016

(54) SYSTEM AND METHOD FOR DIGITAL CORRELATED DOUBLE SAMPLING IN AN IMAGE SENSOR

(71) Applicant: OmniVision Technologies, Inc., Santa Clara, CA (US)

(72) Inventors: Jie Shen, Fremont, CA (US); Tiejun Dai, Santa Clara, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 40 days.

(21) Appl. No.: 14/317,059

(22) Filed: Jun. 27, 2014

(65) Prior Publication Data

US 2015/0381911 A1 Dec. 31, 2015

(51) Int. Cl.
*H04N 5/357* (2011.01)
*H04N 5/378* (2011.01)

(52) U.S. Cl.
CPC ............. *H04N 5/3575* (2013.01); *H04N 5/378* (2013.01)

(58) Field of Classification Search
CPC ... H04N 5/3575; H04N 5/378; H04N 5/3698; H03M 1/0607; H03M 1/56; H03M 1/123; H03M 1/1295
See application file for complete search history.

(56) References Cited

U.S. PATENT DOCUMENTS

| 8,354,630 | B2* | 1/2013 | Hoshino | H03M 1/144 250/208.1 |
| 8,411,179 | B2* | 4/2013 | Mori | H04N 5/374 348/294 |
| 8,606,051 | B2* | 12/2013 | Wang | H03M 1/1009 341/126 |
| 2005/0046715 | A1* | 3/2005 | Lim | H04N 1/40056 348/294 |
| 2009/0244334 | A1* | 10/2009 | Otaka | H04N 5/3575 348/294 |
| 2009/0278969 | A1* | 11/2009 | Hisamatsu | H03K 23/548 348/308 |
| 2010/0321547 | A1* | 12/2010 | Morikawa | H03M 1/0624 348/294 |
| 2012/0287316 | A1* | 11/2012 | Kim | H04N 5/378 348/294 |

* cited by examiner

*Primary Examiner* — Roberto Velez
*Assistant Examiner* — Tuan Le
(74) *Attorney, Agent, or Firm* — Lathrop & Gage LLP

(57) ABSTRACT

A system for performing digital correlated double sampling in an image sensor includes a memory for storing most significant bits of the digital image data and reset data produced by an analog-to-digital convertor. The system further includes least significant bit latches for each of the digital image data and reset data. The most significant bits are recombined with the least significant bits in respective recombined latches for each of the digital image data and reset data. A correlated double sampling stage then performs correlated double sampling and stores the correlated double sampled data in memory.

20 Claims, 4 Drawing Sheets

SYSTEM AND METHOD FOR DIGITAL CORRELATED DOUBLE SAMPLING IN AN IMAGE SENSOR

BACKGROUND

Image sensing devices commonly utilize Charged-Coupled Devices (CCD) or Complementary-Metal-Oxide-Semiconductor (CMOS) image sensors to capture image data of an imaged scene. CCD and CMOS devices include an array of photosensing devices, or pixels, that are exposed to light irradiated from the scene for a particular amount of time. This exposure time allows the individual pixels to "charge" or "integrate" until the pixels have a particular signal voltage value (also known as the pixel grey value.) These individual signal voltage values then may be correlated into digital image data representing the imaged scene.

Image quality is very important, and can vary based on a plurality of variables. For example, increasing the number of pixels within the array provides more image data, thus higher quality. Additionally, it is desirable to eliminate as much noise in the image data as possible. One known way to reduce noise (for example Fixed Pattern Noise) is correlated double sampling (CDS), particularly in CMOS imaging sensors. Correlated double sampling may be done in analog or digital domain.

CDS reduces the noise in the signal by calculating the difference between the signal voltage value (grey value), and a reset signal for the given pixel. Implementing CDS reduces the fixed pattern noise and other temporal noise from the image data.

SUMMARY OF THE INVENTION

In a first aspect, a system for digital correlated double sampling for an image sensor having a plurality of pixels includes: an analog-to-digital convertor (ADC) stage for converting analog data into digital image data and outputting reset data; a memory for storing (i) one or more most significant bits (MSB) of the digital image data, and (ii) one or more MSB of the reset data; a LSB image data storage latch for storing one or more least significant bits (LSB) of the digital image data; a LSB reset data storage latch for storing one or more LSB of the reset data; a combined image data latch for storing recombined digital image data based upon (i) a portion of the LSBs from the at least one LSB image data storage latch and (ii) corresponding MSBs of the digital image data from the memory for a selected set of the digital image data to be correlated double sampled; a combined reset data latch for storing recombined reset data based upon (i) a portion of the LSBs from the at least one LSB reset data storage latch and (ii) corresponding MSBs of the reset data from the memory for a selected set of the reset data to be correlated double sampled; and, a digital correlated double sampling (DCDS) stage for generating digitally correlated double sampled image data based upon the recombined digital image data and the recombined reset data.

In a second aspect, a method for digital correlated double sampling for an image sensor having a plurality of pixels includes: converting analog image data into digital image data using an analog-to-digital converter (ADC) stage; storing, directly into memory, at least one most significant bit (MSB) of (i) the digital image data, and (ii) reset data from the ADC stage; storing at least one least significant bit (LSB) of the digital image data into a LSB image data latch; storing at least one least significant bit (LSB) of the reset data into a LSB reset data latch; generating, within a recombined image data latch, recombined digital image data by combining (i) the LSB from the LSB data latch with (i) the corresponding MSB of the digital image data from the memory for a selected set of the digital image data; generating, within a recombined reset data latch, recombined reset data by combining (i) the LSB from the LSB reset data latch with (i) the corresponding MSB of the reset data from the memory for a selected set of the reset data; and generating correlated double sampled image data based upon the recombined image data and recombined reset data.

BRIEF DESCRIPTION OF THE FIGURES

The foregoing and other features and advantages of the disclosure will be apparent from the more particular description of the embodiments, as illustrated in the accompanying drawings, in which like reference characters refer to the same parts throughout the different figures. The drawings are not necessarily to scale, emphasis instead being placed upon illustrating the principles of the disclosure.

DETAILED DESCRIPTION OF THE EMBODIMENTS

Prior art examples of CDS typically occur either (i) after the grey code value is stored within memory, or (ii) prior to storing within memory.

Figure 1:
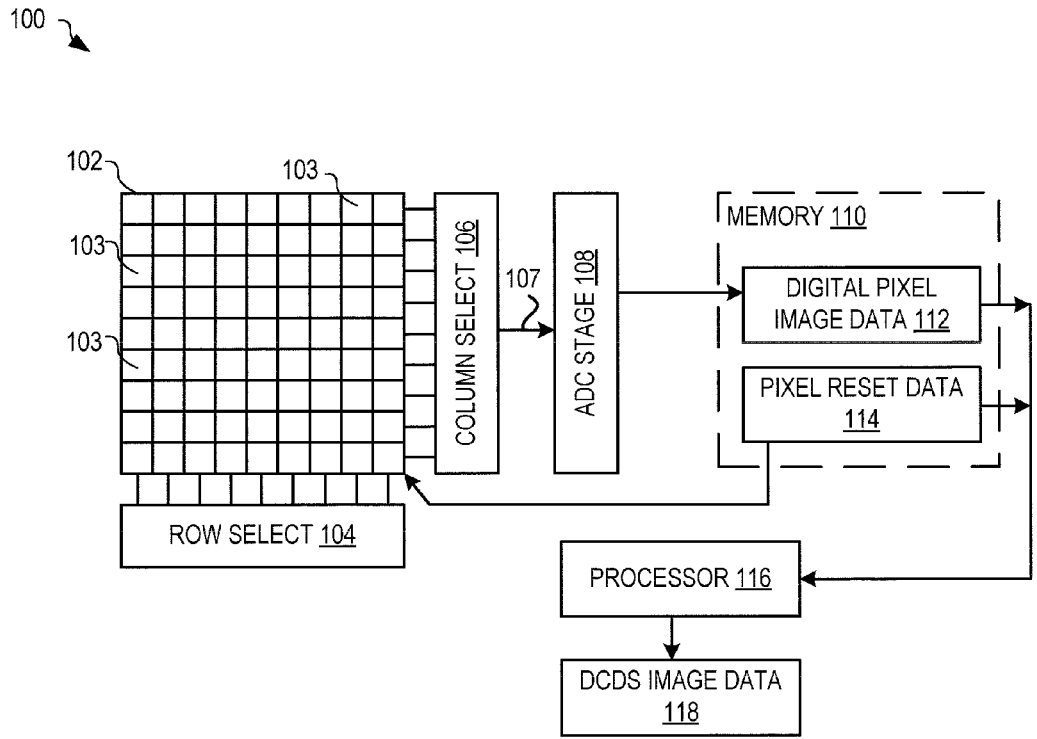
FIG. 1 depicts an exemplary block diagram of a system for implementing CDS after memory write.

FIG. 1 depicts an exemplary block diagram of system 100 for implementing CDS after memory write. System 100 includes an array 102 of pixels 103, row select logic 104, column select logic 106, respectively analog-to-digital conversion (ADC) stage 108, memory 110, and processor 116. Row and column select logic 104, 106 operate to control exposure of each pixel 103 within array 102 to generate raw analog image data 107 of each pixel. Raw image data 107 is then converted from analog to digital via ADC stage 108. Converted digital image data is then stored within memory 110 as digital pixel image data 112, for example as a digital intensity value of each pixel 103. Memory 110 further stores pixel reset data 114 which is utilized to (i) reset each pixel 103, and (ii) implement CDS. To implement CDS, processor 116 subtracts the digital pixel image data 112 from the reset data 114 to generate digital CDS (DCDS) image data 118.

ADC stage 108 for example includes 39 ADC for reading out a particular block of columns of data from array 102. There may be multiple ADC stages for reading out the entire array 102 of pixels 103. Additionally, ADC stage 108 may have a global or local counter. Global counter means that a single counter is shared by all ADCs. Alternatively, a local counter means that each individual ADC within ADC stage 108 operates according to its own counter or that each ADC stage 108 operates according to an individual counter. Local counters may be undesirable because they consume more power and utilize more space.

There are numerous disadvantages to utilizing DCDS after memory storage, as illustrated in FIG. 1. For example, although this approach has the least amount of pre storage logic, and does not require temporary latch storage and adder logic to implement the CDS, system 100 requires twice the memory, as implementing DCDS prior to memory write, within memory 110. Moreover, not all memory types can be utilized as memory 110. Often, it is desirable to utilize dynamic random-access memory (DRAM) memory as memory 110. However, ADC stage 108 typically operates at a much faster frequency than the read/write frequency of DRAM memory. For example, ADC stage 108 may output at a frequency of 200 MHz, whereas typical read/write frequency of DRAM memory is capped out at 100 MHz. One way to compensate for this difference in operating frequency is to utilize SRAM. However, SRAM is much more expensive than DRAM, and therefore often is not desirable for use. Moreover, as discussed above, direct writing into SRAM utilizes twice the memory, and therefore consumes much more area, which is undesirable for compact camera systems.

Figure 2:
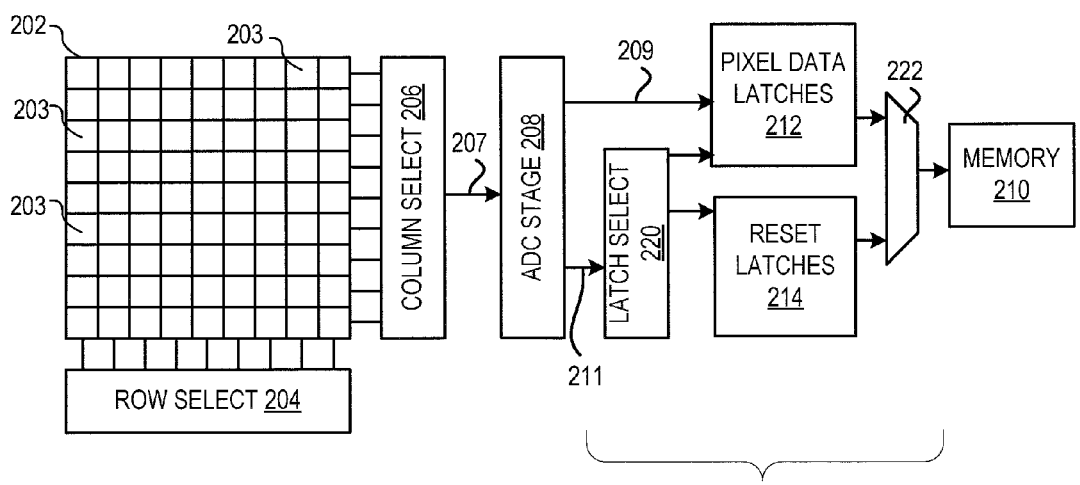
FIG. 2 depicts an exemplary block diagram of a system for implementing CDS prior to memory write.

FIG. 2 depicts an exemplary block diagram of a system 200 for implementing CDS prior to memory write. System 200 includes array 202 of image sensors 203, row select logic 204, column select logic 206, analog-to-digital conversion (ADC) stage 208, memory 210. Each of array 202, pixels 203, row select logic 204, column select logic 206, ADC 208 are similar to array 102, pixels 103, row select 104, column select 105, and ADC 108 of FIG. 1, respectively. Memory 210 differs from memory 110 in that memory 210 is capable of being DRAM, instead of SRAM. This difference is enabled via DCDS stage 290, which implements correlated double sampling prior to writing image data in memory 210. DCDS stage 290 includes reset data latches 214 for storing pixel reset data and pixel data latches 212 for temporarily storing image data.

In operation, raw pixel data 207 is converted from analog to digital via ADC stage 208. ADC stage 208 generates a write enable output 211 used to (i) control which specific latches within latches 212 and 214 the digital pixel image data and reset data is stored within, and (ii) select image data from pixel data latches 212 and reset data from reset latches 214 for correlated doubling sampling. Correlated double sampling is implemented via CDS logic 222, which subtracts selected pixel data 209, stored within latches 212, from selected reset data stored within latches 214.

All digital sampled pixel data 209 is stored within pixel data latches 212. For example, where ADC stage 208 includes 39 individual ADC components, and each digital sampled pixel data 209 is ten bits, then pixel data latches 212 must be at least 39×10. Moreover, each reset signal for the given pixel is ten bits, therefore the reset latches 214 must be at least 39×10 as well. Therefore, pixel data and reset latches 212, 214 undesirably must have large areas because of the large size (i.e. large number of bits) of the digital sampled pixel data 209 and reset data required to complete the correlated double sampling. Additionally, continuing with the example of 39 individual ADC components within ADC stage 208, system 200 requires a long processing time as it takes 39 cycles for full ten bit memory write into the pixel data latches 212.

Figure 3:
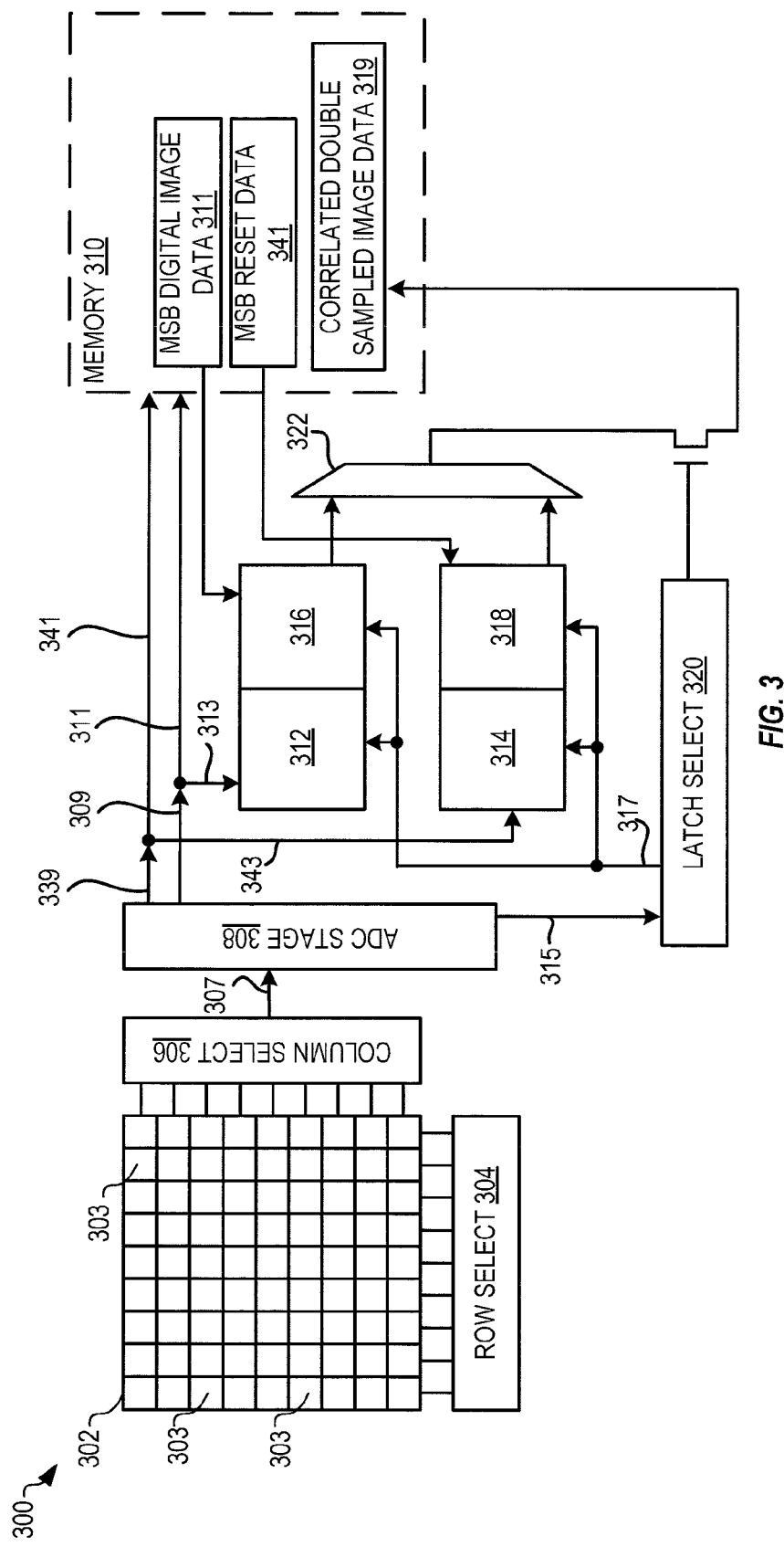
FIG. 3 depicts an embodiment of a system for implementing digital CDS in an image sensor between memory read and memory write.

FIG. 3 depicts an embodiment of a system 300 for implementing DCDS in an image sensor between memory read and memory write. System 300 addresses at least two significant problems within the prior art (e.g. FIGS. 1 and 2, discussed above). First, the "real estate" (e.g. physical area) that the components of the DCDS system consume is important. Modern imaging applications, such as smartphones, automobiles, etc., have strict size constraints. Therefore, use of an SRAM is typically undesired as SRAM memory is much larger than DRAM. Second, where DRAM memory is utilized, the ADC stage (i.e. ADC stage 308) typically outputs data at a much higher frequency than the read/write constraints of the DRAM memory. Thus, temporary storage latches (i.e. latches 212, 214) are used as a holding stage before writing into memory. However, these temporary latches again utilize valuable real estate within the imaging apparatus. Therefore, a need exists to balance the physical presence of DCDS components with the operating frequencies of the ADC stage and memory utilized. System 300 addresses at least this need.

System 300 includes an array 302 of image sensors 303, row select logic 304, column select logic 306, and analog-to-digital conversion (ADC) stage 308. Row and column select logic 304, 306 are similar to row and column select logics 104, 204, 106, 206 of FIGS. 1 and 2, respectively and operate to control exposure of each pixel 303 within array 302 to generate raw analog image data 307 of each pixel. In the illustrated embodiment, a single ADC stage 308 is shown. In other embodiments, multiple ADC stages may be used in system 300 for reading out the entire array 302 of pixels 303.

System 300 further includes memory 310. In a preferred embodiment, memory 310 is DRAM memory. As discussed above, DRAM memory is much less expensive than other types of memory, such as SRAM. However, DRAM memory has read/write constraints such as the speed at which data can be written into or read from the memory. System 300 further includes LSB image data latches 312, reset LSB data latches 314, full data latches 316, and reset full data latches 318, each of which is discussed in further detail below. Latch select 320 operates to control storage within each of latches 312, 314, 316, 318 and memory 310 via write enable signal 317 based upon write enable output 315 from ADC stage 308. This allows for writing to multiple bit latches. For example, where all 39 ADC's of ADC stage 308 output the same value, the output of all 39 ADCs will latch at the same time.

Image Data Flow

Figure 4:
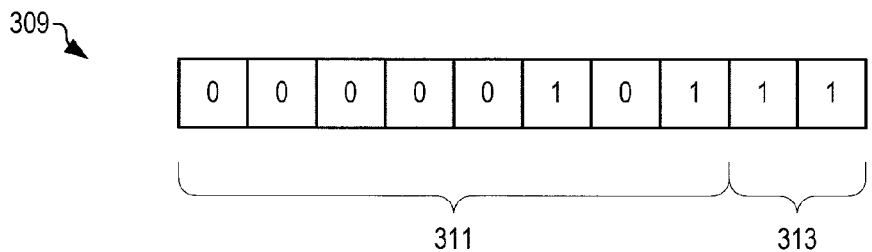
FIG. 4 depicts exemplary digital pixel data generated via the ADC stage of FIG. 3 having a data size of ten bits, including eight MSBs and two LSBs.

Raw analog image data 307 of each pixel is converted into digital pixel data 309 including a plurality of most significant bits (MSB) 311, and one or more least significant bits (LSB) 313 via ADC stage 308. FIG. 4 depicts exemplary digital pixel data 309 generated via ADC stage 308, of FIG. 3, having a data size of ten bits, including eight MSBs 311 and two LSBs 313. It should be appreciated that although digital pixel data 400 is shown having 8 MSBs and 2 LSBs, the ratio of MSBs to LSBs may differ without altering the scope hereof.

Referring back to FIG. 3, system 300 takes advantage of the concept that, within digital pixel data 309, the value of MSBs 311 (e.g. the binary value 0 or 1) changes at a much lower frequency than the value of LSBs 313. In one example of operation, the value of MSBs 311 change at a frequency of 50 MHz or less, whereas the values of LSBs 313 change at a frequency of 200 MHz or less. For example, the value of LSBs 313 may change with each output signal from ADC stage 308. MSBs change at slower rate because intensity values generated by the pixels typically does not change rapidly from ADC to ADC.

Figure 5:
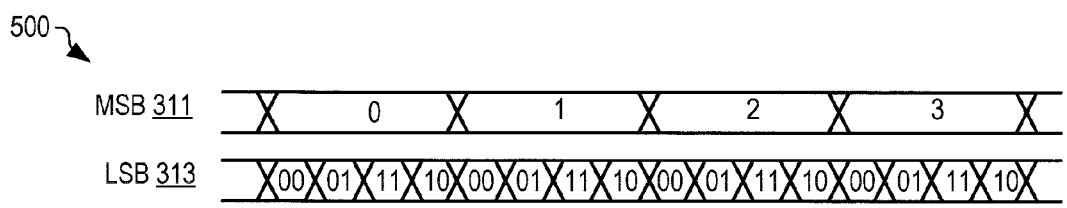
FIG. 5 depicts an exemplary diagram 500 showing value change of both MSBs 311 and LSBs 313.

MSBs 311 are stored directly into memory 310. Because MSBs 311 change at a frequency of 50 MHz or less, this change is capable of being stored directly in DRAM memory 310, which has a read/write capability of 100 MHz or less. Accordingly, the quantity of bits within LSBs 313 and MSBs 311 may be determined based upon the read/write speed of memory 310. In any case, the MSBs 311 should change at a rate lower than the read/write speed of memory 310. FIG. 5 depicts an exemplary diagram 500 showing value change of both MSBs 311 and LSBs 313. The value of MSBs 311 changes (i) at a slower rate than the LSBs 313 and (ii) at a slower rate than the read/write capability of memory 310. However, the value of the LSBs typically changes at a higher rate than the read/write capability of memory 310. Therefore, MSBs 311 may be stored directly into memory 310, whereas LSBs 313 must be stored within temporary storage latches to compensate for the rapid change. The ratio of MSBs 311 to LSBs 313 may be predetermined and static within system 300. Alternatively, the ratio of MSBs 311 to LSBs 313 may be configurable such that it can be dynamically altered based upon the scene being imaged.

LSBs 313 are stored within LSB data latches 312. LSB data latches 312 utilize much less physical area than typical temporary data latches (i.e. data latches 212) because typical temporary data latches must store all of the bits of the image data; whereas LSB data latches 312 only store the LSBs 313. For example, where ADC stage 308 consists of 39 individual ADCs, and there are a total of two LSB within LSB data 313, LSB data latches only needs to be 39×2.

Figure 6:
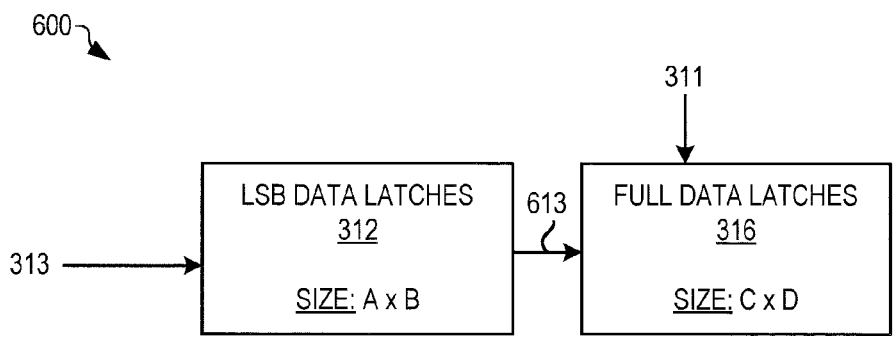
FIG. 6 depicts relationship between the LSB data latches and the full data latches, of FIG. 3, in greater detail.

A portion of LSB data 313 stored within LSB data latches 312 is then combined with the MSB data 311 in full data latches 316. For example, MSB digital pixel data 311 is pulled from memory 310 and combined within full data latches 316. FIG. 6 depicts relationship 600 between LSB data latches 312 and full data latches 316 in greater detail. Within relationship 600, LSB data latches 312 has a size of A×B, and full data latches 316 as a size of C×D. A, B, C, and D have the following constraints:

A plus C equals the total number of ADCs within ADC stage 308. For example, where there are 39 ADCs within ADC stage 308, A may be 35 and C may be 4.

B equals the number of LSB bits in LSB data 313. For example, LSB data may be two bits of the grey code value of digital pixel data 309.

D equals the total number of bits in digital pixel data 309 (i.e. MSB data 311 quantity plus LSB data 313 quantity).

As discussed above, LSB data 313 is stored in temporary LSB data latches 312, LSB data 613 corresponding to a selected set of the digital pixel image data 307 to be processed for DCDS is then transferred to full data latches 316, and combined with MSB data 311 from memory 310 as recombined digital pixel image data. Accordingly, recombined digital pixel image data comprises MSBs and LSBs that correlate to each other for a given pixel within the image array. Relationship 600 may be similar for reset LSB latches 314 and reset full data latches 318, discussed in further detail below.

In an alternate embodiment, a portion of digital pixel data 309 is stored directly into full data latches 316. For example, where full data latches 316 is comprised of a 4×10 array of latches, the output of the first (or last) four ADCs within ADC stage 308 are stored directly into full data latches. In other words, the MSBs 311 and LSBs 313 of a portion of the pixel data 309 are both stored directly into full data latches 316. The remainder of the pixel data 309 is stored according to the above description (i.e. MSBs are stored directly to memory 310, LSBs are stored into LSB data latches 312, the MSBs and LSBs are recombined in full data latches 314). Similar operation may occur for reset data 339.

Reset Data Flow:

Referring back to FIG. 3, ADS stage 308 further outputs reset data 339. Reset data 339 includes the reset values output by each ADC for a given pixel, or column, within array 302. Reset data 339 is processed in a similar manner to image data 309.

Reset data 339 is split into reset MSBs 341 and reset LSBs 343. Reset MSBs 341 change at a frequency lower than the read/write capabilities of memory 310. For example, reset MSBs 341 change at a rate slower than 50 MHz. Accordingly, reset MSBs 341 are stored directly into memory 310. Reset LSBs 343 change at a frequency faster than the read/write capabilities of memory 310. For example, LSBs 343 change a rate of 0-200 MHz. Accordingly, reset LSBs 343 must be stored within temporary reset LSB data latches 314. The ratio of reset MSBs 341 to reset LSBs 343 is the same as the ratio of MSBs 311 to LSBs 313.

A portion of reset LSBs 343 are then transferred from reset data latches 314 into reset combined data latches 318 and combined with corresponding reset MSBs 343 from memory 310. Reset LSB latches 314 and reset combined data latches 318 may have the same relationship 600 as discussed above with respect to LSB data latches 312 and combined data latches 316, respectively.

DCDS Stage:

System 300 further includes CDS stage 322, for example a subtractor, which calculates the difference between the reset value and full data from full data latches 316 to produce correlated double sampled image data 319 stored within memory 310. Correlated double sampling must be performed on the whole data, which is why the MSBs and LSBs of both the image data 309 and reset data 339 must be recombined in combined image latches 316 and combined reset data latches 318, respectively. Moreover, referring to relationship 600, variable "D" defines how many sets of recombined data are present. For example, where D equal 4, then there are 4 sets of recombined data from 4 ADCs within ADC stage 308.

Figure 7:
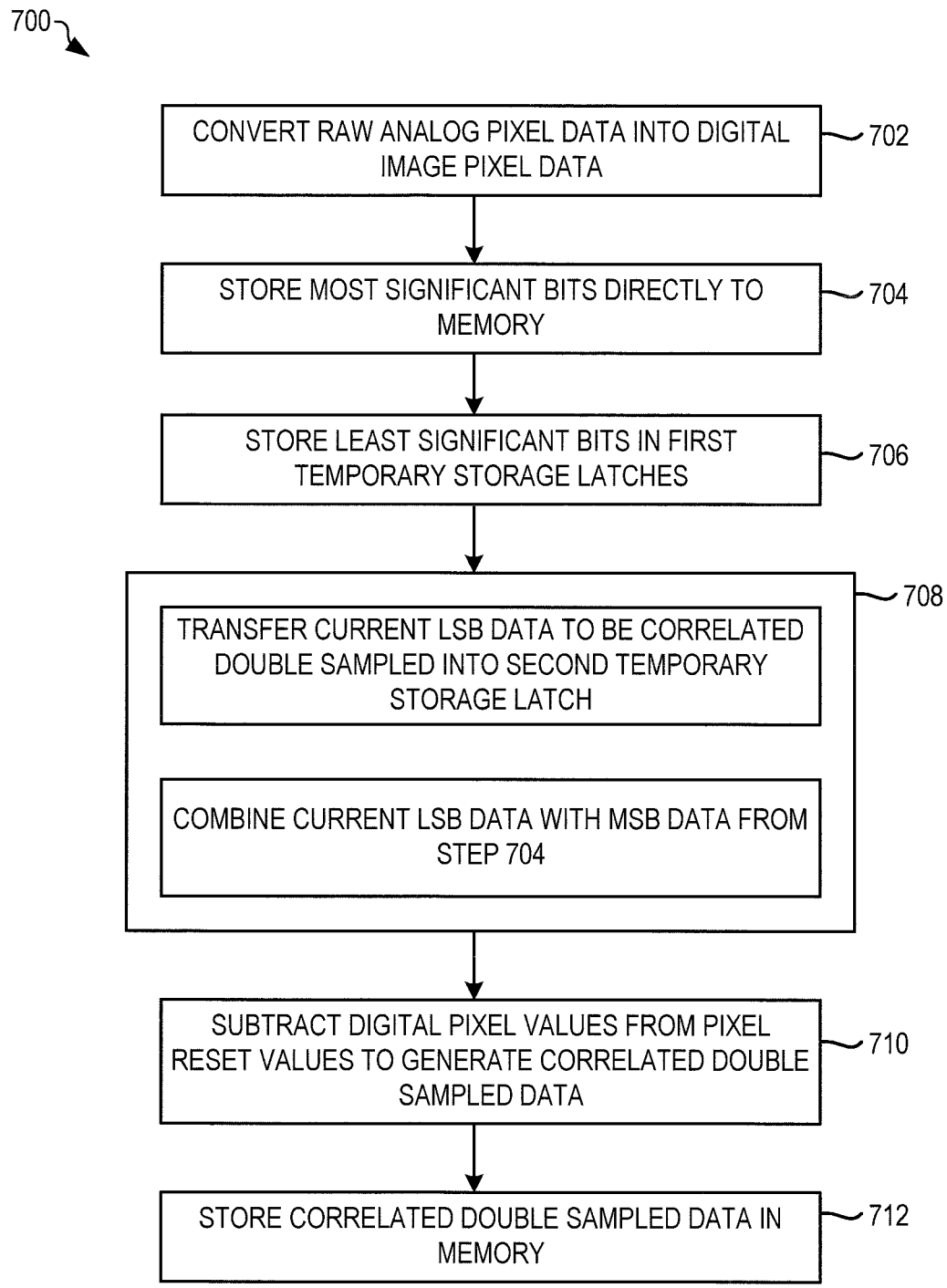
FIG. 7 depicts an exemplary method for digital correlated double sampling in an image sensor, in one embodiment.

FIG. 7 depicts an exemplary method 700 for digital correlated double sampling in an image sensor, in one embodiment. Method 700 is implemented using system 300, of FIG. 3, for example.

In step 702, method 700 converts raw analog digital image data into digital image pixel data having a plurality of MSBs and at least one LSB. In one example of step 702, ADC stage 308 converts raw analog image data 307 into digital image pixel data 309 including MSBs 311 and LSBs 313.

In step 704, method 700 stores the most significant bits of the digital image pixel data from step 702 directly to memory. In one example of step 704, MSBs 311 and reset MSBs 341 are stored directly into DRAM 310.

In step 706, method 700 stores the least significant bits of the digital image pixel data from step 702 within a first temporary storage latch. In one example of step 706, LSBs 313 are stored within LSB data latches 312 and reset LSBs 343 are stored within reset LSB data latches 314.

In step 708, method 700 transfers current LSB data to be correlated double sampled to a second temporary storage latch and combined with MSB from step 704. In one example of step 708, current LSB data 613 is transferred to combined data latches 316 and combined with corresponding MSB 311 from memory 310 as recombined digital image data. Additionally current reset LSB data 343 is transferred to combined reset data latches 318 and combined with corresponding MSB 341 from memory 310 as recombined reset data.

In step 710, method 700 performs digital correlated double sampling by subtracting the recombined digital image data values from recombined reset values stored in step 708. In one example of step 710, subtractor 322 determines the difference between reset values within reset full data latches 318 and full data latches 316.

In step 712, method 700 stores the correlated double sampled value from step 710 within memory. In one example of step 712, correlated double sampled image data 319 is stored within memory 310.

As discussed above, system 300 and method 700 provide significant advantages over the prior art. Physical requirements for system 100 of FIG. 1 and system 200 of FIG. 2 are much more than that of the present embodiments. Therefore, system 300 is significantly size effective over systems 200 and 100. In fact, system 300 utilizes almost half the size of system 100, and almost a third of the size of system 200 (less than a third for system 200 using a local counter). Moreover, this reduced area outweighs any extra processing time required to transfer the MSBs 911 to and from memory 310.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A system for digital correlated double sampling for an image sensor having a plurality of pixels, the system comprising:
   an analog-to-digital convertor (ADC) stage for converting analog data into digital image data and outputting reset data;
   a memory for storing (i) one or more most significant bits (MSB) of the digital image data, and (ii) one or more MSB of the reset data;
   a LSB image data storage latch for storing one or more least significant bits (LSB) of the digital image data;
   a LSB reset data storage latch for storing one or more LSB of the reset data;
   a combined image data latch for storing recombined digital image data based upon (i) a portion of the LSBs from the at least one LSB image data storage latch and (ii) corresponding MSBs of the digital image data from the memory for a selected set of the digital image data to be correlated double sampled;
   a combined reset data latch for storing recombined reset data based upon (i) a portion of the LSBs from the at least one LSB reset data storage latch and (ii) corresponding MSBs of the reset data from the memory for a selected set of the reset data to be correlated double sampled; and,
   a digital correlated double sampling (DCDS) stage for generating digitally correlated double sampled image data based upon the recombined digital image data and the recombined reset data.

2. The system of claim 1, the memory comprising dynamic random-access memory (DRAM).

3. The system of claim 1, further comprising an output from the ADC stage for controlling read/write enable of the first and second temporary storage latches and the memory.

4. The system of claim 1, the correlated double sampling stage comprising a subtractor.

5. The system of claim 4, the digitally correlated double sampled image data representing the recombined digital image data subtracted from the recombined reset value.

6. The system of claim 1, each of LSB image data and LSB reset data latches comprising a plurality of latches in a A×B matrix, respectively, and each of the combined image data and combined reset data latches a plurality of latches in a C×D matrix, respectively;
   wherein:
   A plus C is at least equal to a quantity of ADC components in the ADC stage,
   B is at least equal to a quantity of the LSBs, and
   D is at least equal to the quantity of the LSBs plus a quantity of the MSBs.

7. The system of claim 1, wherein the ADC stage outputs at a frequency of approximately 200 MHz.

8. The system of claim 7, wherein the LSB values of the image data and reset data change at a rate of 200 MHz or less.

9. The system of claim 7, wherein the MSB values of the image data and reset data change at a rate of 50 MHz or less.

10. The system of claim 1, wherein the MSB values change at a rate slower than the read/write speed of the memory.

11. A method for digital correlated double sampling for an image sensor having a plurality of pixels, the method comprising:
    converting analog image data into digital image data using an analog-to-digital converter (ADC) stage;
    storing, directly into memory, at least one most significant bit (MSB) of (i) the digital image data, and (ii) reset data from the ADC stage;
    storing at least one least significant bit (LSB) of the digital image data into a LSB image data latch;
    storing at least one least significant bit (LSB) of the reset data into a LSB reset data latch;
    generating, within a recombined image data latch, recombined digital image data by combining (i) the LSB from the LSB data latch with (ii) the corresponding MSB of the digital image data from the memory for a selected set of the digital image data;
    generating, within a recombined reset data latch, recombined reset data by combining (i) the LSB from the LSB reset data latch with (ii) the corresponding MSB of the reset data from the memory for a selected set of the reset data;
    generating correlated double sampled image data based upon the recombined image data and recombined reset data.

12. The method of claim 11, the step of storing at least one MSB comprising storing the at least one MSB directly into dynamic random-access memory (DRAM).

13. The method of claim 11, further comprising controlling read/write enable into the latches and the memory based upon an output from the ADC stage.

14. The method of claim 11, the step of generating correlated double sampled image data comprising subtracting the recombined image data from the recombined reset data.

15. The method of claim 11, the step of converting analog image data comprising outputting the digital image data at a rate of 200 MHz or less.

16. The method of claim 15, the step of storing the at least one MSB comprises storing changes in values of the MSBs at a rate of 50 MHz or less.

17. The method of claim 15, the steps of storing the at least one LSB of the image data and the reset data comprising storing changes in values of the LSBs at a rate of 200 MHz or less.

18. The method of claim 11, wherein the step of converting generates the digital image data at a rate higher than a read/write rate of the memory.

19. The method of claim 11, further comprising repeating the steps of (i) converting the analog image data, (ii) storing the MSB of the digital image data and reset data, (iii) storing the LSB of the digital image data (iv) storing the LSB of the reset data, (v) generating recombined digital image data, (vi) generating recombined reset data, and (vii) generating correlated double sampled image data for additional selected sets of the digital image data.

20. The method of claim 19, wherein the MSB values change at a rate slower than the read/write speed of the memory.

* * * * *